Figure 2:
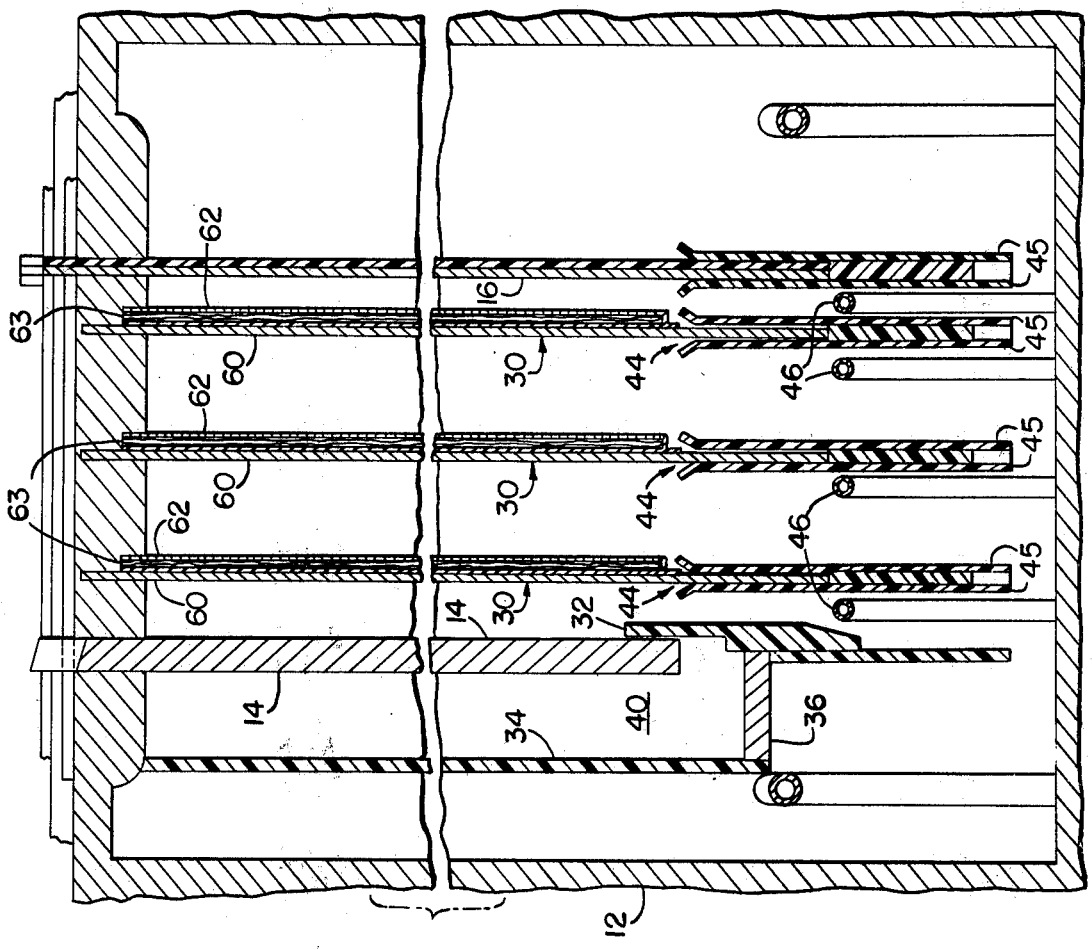
Figure 1:
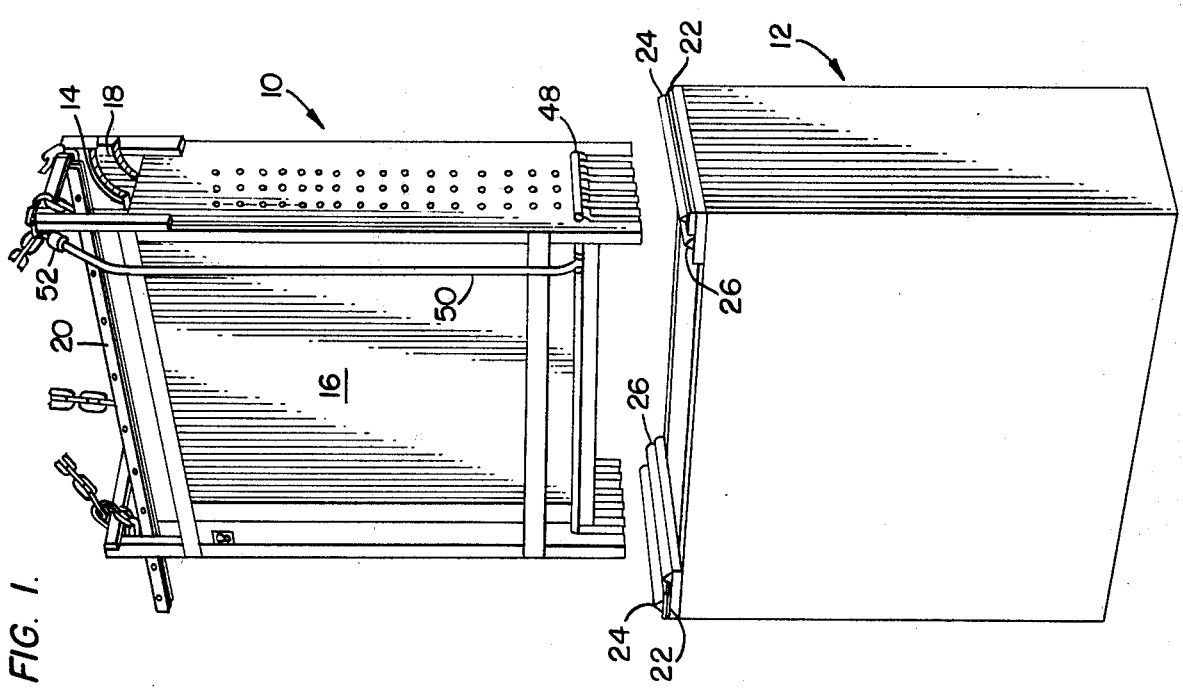
Figure 3:
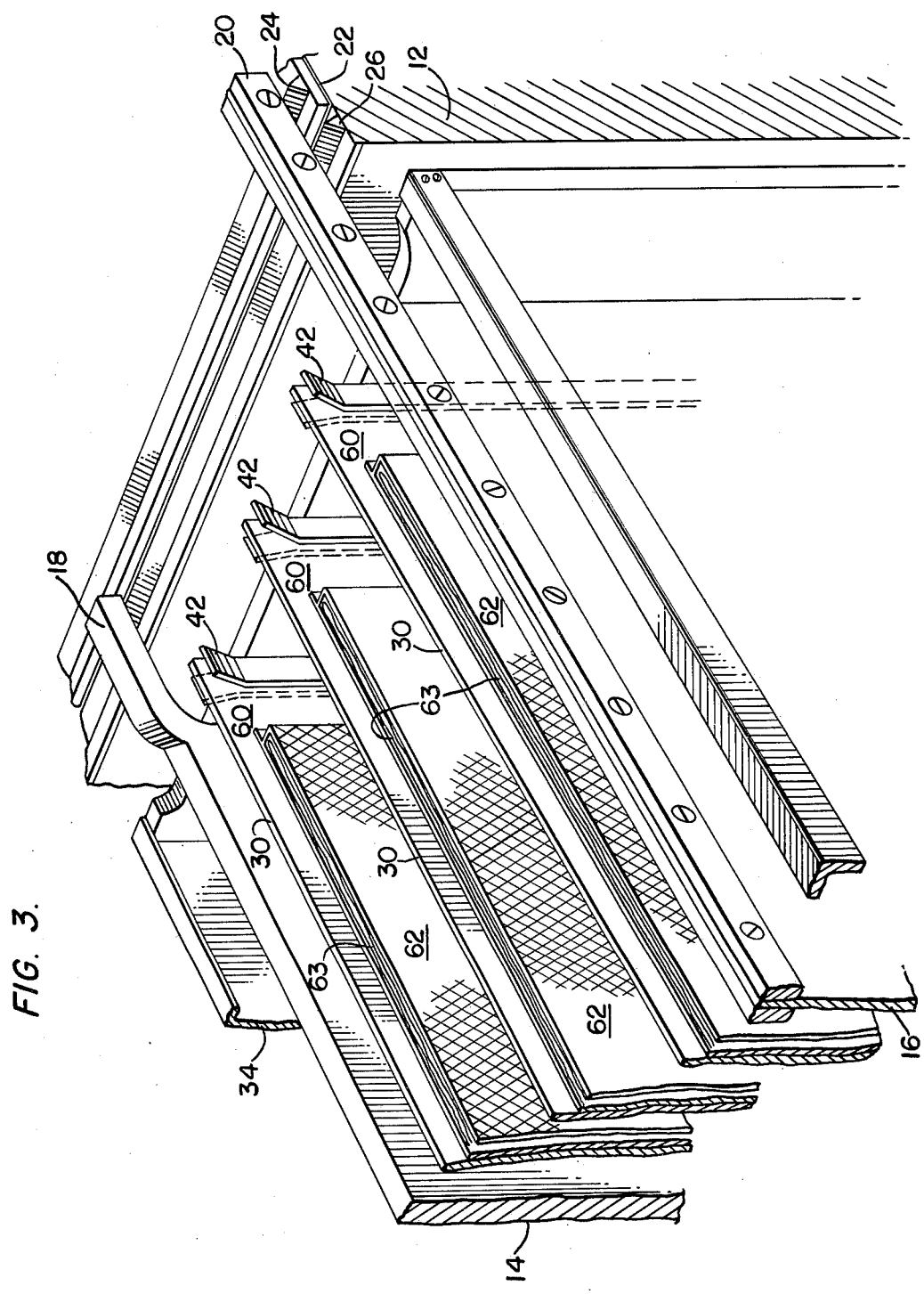

United States Patent [19]

Wingler et al.

[11] 4,193,897

[45] Mar. 18, 1980

[54] CONTACT LENSES FORMED OF MIXTURES OF CELLULOSE ESTERS AND ETHYLENE/VINYL ACETATE COPOLYMERS

[75] Inventors: Frank Wingler, Leverkusen; Theobald Eicher, Dormagen; Friedemann Muller, Neuss; Winfried Fischer, Cologne; Richard Prinz, Leverkusen, all of Fed. Rep. of Germany

[73] Assignee: Bayer Aktiengesellschaft, Fed. Rep. of Germany

[21] Appl. No.: 13,468

[22] Filed: Feb. 21, 1979

[30] Foreign Application Priority Data

Feb. 23, 1978 [DE] Fed. Rep. of Germany ....... 2807663

[51] Int. Cl.$^2$ ............................ C08L 1/14; G02C 7/04
[52] U.S. Cl. .............................. 260/17 R; 351/160 R; 351/160 H
[58] Field of Search ........................ 260/17 R; 351/160

*Primary Examiner*—Edward M. Woodberry
*Attorney, Agent, or Firm*—Connolly and Hutz

[57] ABSTRACT

Contact lenses and scleral lenses formed of mixtures consisting essentially of (1) from 99 to 70% by weight of a cellulose ester of one or more aliphatic carboxylic acids, and (2) from 1 to 30% by weight of an ethylene/vinyl acetate copolymer containing from 30 to 98% by weight of incorporated vinyl acetate.

4 Claims, No Drawings

U.S. Patent  Mar. 18, 1980  Sheet 1 of 4  4,193,897

FIG. 4.
FIG. 5.
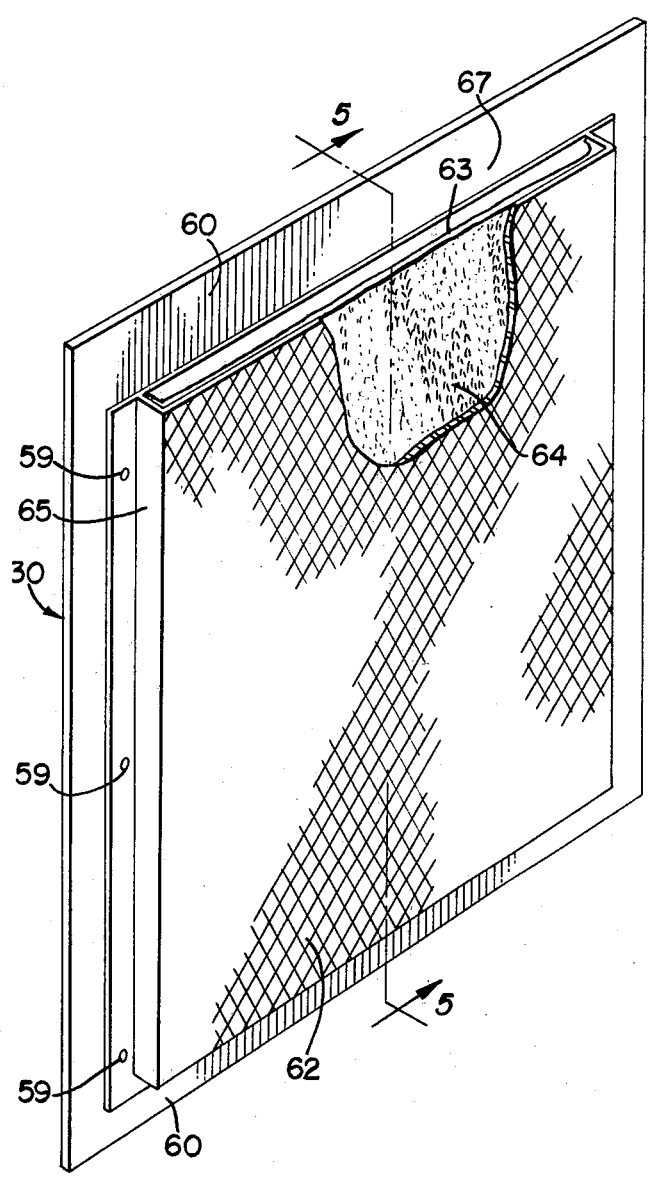
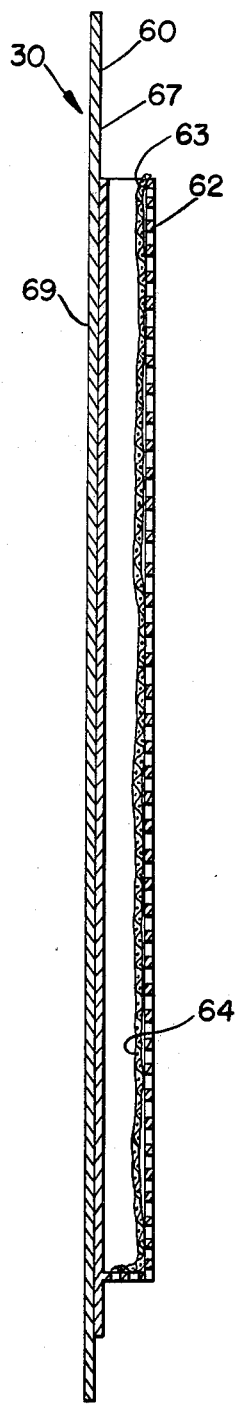

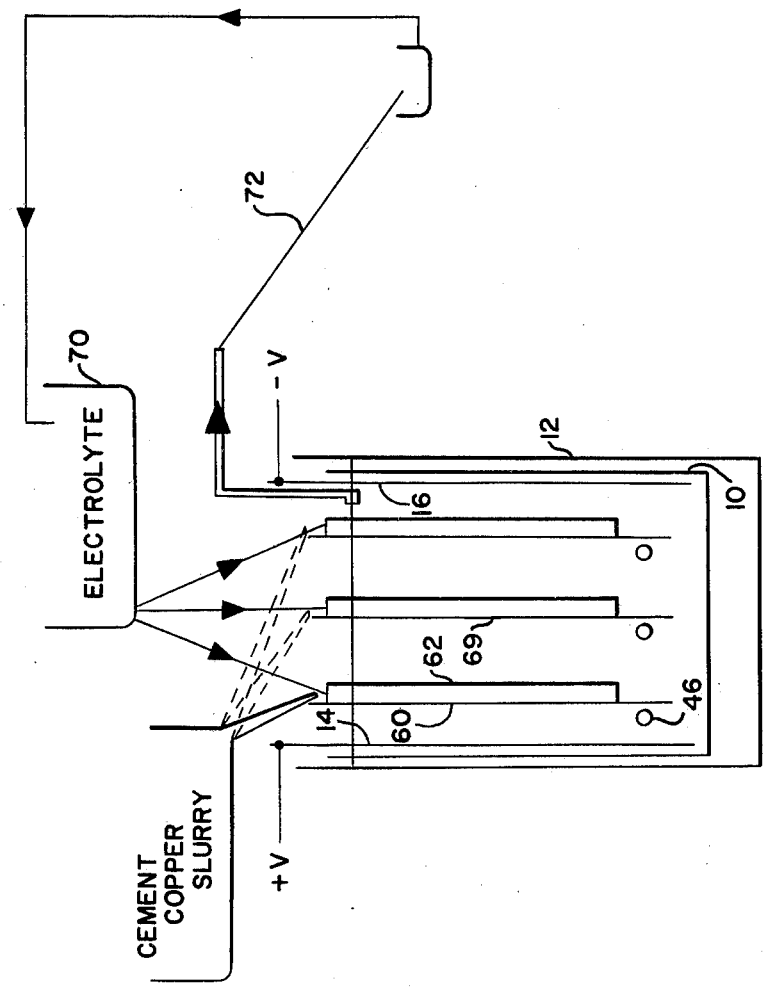

CONTACT LENSES FORMED OF MIXTURES OF CELLULOSE ESTERS AND ETHYLENE/VINYL ACETATE COPOLYMERS

This invention relates to contact lenses and scleral lenses formed of certain mixtures of cellulose esters and ethylene/vinyl acetate copolymers and to the use of these mixtures for the production of refractive materials for optical contact lenses.

A number of different polymers are already being used for contact lenses. The materials are in direct contact with the cornea and, for this reason, have a considerable influence upon the metabolic processes and upon the oxygen balance. The materials may produce irritation by the direct contact thereof with the eye.

Contact lenses are generally divided into two main types, namely hard lenses and soft, hydrophilic lenses. Lenses of the first type have been known for several years and are normally produced from polymethyl methacrylate which may be cut and polished to give lenses having good optical properties. However, hard polymethyl methacrylate lenses are attended by the known disadvantage that they may irritate the cornea and the inside of the eyelid. If, therefore, a patient is to wear hard lenses, a considerable period of acclimatisation is required during which the patient wears the lenses for gradually increasing periods up to a maximum of about eight hours' continuous wearing. On account of this disadvantage, hard lenses are worn by only a small number of patients.

Recent years have seen the introduction of soft contact lenses consisting of hydrogels of hydrophilic polymers. Soft contact lenses have largely been able to overcome the problem of irritation of the eyes, so that patients may now acclimatise themselves much more quickly to the wearing of contact lenses. Just like hard contact lenses, however, conventional soft lenses have another serious disadvantage which is well known among experts. This disadvantage lies in the fact that neither type of lens is capable of supplying the cornea with enough oxygen to maintain its normal metabolic rate. It is known that the surface of the cornea has to receive a reasonable supply of oxygen for the cornea to remain transparent and healthy. It has been found that a minimum atmosphere of 5 equivalent % of oxygen has to be maintained in the vicinity of the cornea in order to avoid histologically detectable changes in the epithelium of the cornea (cf. American Journal of Optometry 49 (4), 1972, pages 329–332). An atmosphere of 5 equivalent % of oxygen is defined as being equivalent to a gaseous atmosphere which contains 5%, by volume, of oxygen and 95% by volume, of nitrogen. According to this definition, a normal atmosphere has an oxygen atmosphere equivalent of 21%.

Conventional hard contact lenses based on polymethyl methacrylate are substantially impervious to oxygen and, to avoid rapid asphyxia of the cornea, the lens is provided with an upwardly turned rim so that during blinking of the eye tear fluid is guided over the surface of the cornea. Although in this way the cornea takes up oxygen from the tear fluid, the concentration of oxygen nevertheless decreases continuously during use to such an extent that prolonged wearing over a period of considerably more than 8 to 10 hours impairs eyesight.

Although they are permeable to oxygen to a certain extent, soft hydrophilic contact lenses do not allow oxygen to pass quickly enough to keep the cornea in a healthy state. Accordingly, soft lenses have been designed in such a way that, when it is in its central position on the eyeball, the lens touches the surface substantially in the annular peripheral region between the cornea and the sclera, whilst the main part of the lens rests on a cushion of tear fluid. Now, the normal blinking movements of the eye result in bending of the lens which acts as a miniature diaphragm and pumps tear fluid over the cornea. However, such design measures are not effective enough to maintain an adequate supply of oxygen to the cornea, so that the period for which the lens may be continuously worn in comfort is not significantly extended beyond about 10 hours, after which an interruption in sight correction is necessary.

Although soft hydrophilic lens materials based on hydroxyethyl methacrylate and/or vinyl pyrrolidone are initially more comfortable to wear than hard lenses by virtue of the hydrophilic properties thereof, they are attended by the serious disadvantage that metabolism products may be deposited in them and bacteria, spores or fungi may penetrate into them and may thus give rise to infection of the eye. Recently, there have even been reports of some cases of delayed damage by soft hydrophilic contact lenses.

Even in cases where non-hydrophilic materials, such as silicone rubber (U.S. Pat. No. 3,996,189), have been used, eye damage has occurred in some cases due possibly to migrating chemical constituents.

U.S. Pat. No. 3,900,250 describes the use of cellulose acetobutyrates. Cellulose acetobutyrates have a horny surface, low hydrophilicity and high permeability to oxygen. However, cellulose acetobutyrate is a material which is virtually impossible to be processed thermoplastically without the addition of processing aids and plasticisers.

In the absence of low molecular weight plasticisers, moulding compositions of cellulose acetate are also virtually impossible to be processed thermoplastically because this ester begins to decompose before softening. The softening and decomposition temperatures of cellulose acetopropionates and acetobutyrates are also fairly close to one another, so that these moulding compositions have to be plasticised for thermoplastic processing. The necessary reduction in the processing temperature and processing viscosity is obtained in this way.

The three hydroxyl groups of the anhydroglucose units of cellulose may in principle be esterified with a number of organic acids. However, of the esters obtainable in this way, only cellulose acetates, cellulose acetopropionates and cellulose acetobutyrates have acquired any real commercial significance. Thermoplastically processible moulding compositions and, for example, acetate silk, block acetate, film supports for safety films, electrical insulating films and lacquers, are produced from these esters.

The plasticisers used for organic cellulose esters are primarily aliphatic esters of phthalic acid, adipic acid, azelaic acid, sebacic acid and phosphoric acid, such as dimethyl phthalate, diethyl phthalate, dibutyl adipate, dioctyl adipate, dibutyl azelate and tributyl phosphate. In many cases, it is also advantageous to use plasticiser mixtures. To improve the processibility thereof, known cellulose acetobutyrate contact lens materials contain processing aids based on phthalates, azelaic acid esters and sebacic acid esters. Unfortunately, the use of such materials is attended by the disadvantage that the plasticisers and processing aids gradually migrate and may cause delayed damage to the eye.

Accordingly, it would be advantageous to use polymeric materials which do not cause any irritation, are chemically inert and comfortable to wear, show high permability to oxygen and do not take up any bacteria or fungi.

It has now been found that contact lens materials having excellent compatibility and high permeability to oxygen may be obtained by using polymer mixtures of cellulose esters of aliphatic carboxylic acids and ethylene/vinyl acetate copolymers as the light-refracting material. In addition, these mixtures have the advantage of being free from plasticisers and processing stabilisers, because the thermoplastic processing thereof does not require such additives.

The present invention relates to contact lenses and scleral lenses formed of light-refracting material of mixtures consisting essentially of (1) from 99 to 70%, by weight, of a cellulose ester of one or more aliphatic carboxylic acids; and (2) from 1 to 30%, by weight, of an ethylene/vinyl acetate copolymer containing from 30 to 98%, by weight of incorporated vinyl acetate.

Suitable cellulose esters for producing the light-refracting materials according to the present invention are cellulose esters of aliphatic carboxylic acids containing from 1 to 5 carbon atoms, preferably cellulose acetate, cellulose acetopropionate and cellulose acetobutyrate.

The process for producing organic cellulose esters have long been known and are described, for example, in Ullmanns Enzyklopadie der technischen Chemie (Verlag Urban u. Schwarzenberg, Munich-Berlin, 1963, Vol. 5, pages 182-201).

Suitable cellulose acetobutyrates generally contain:
from 40 to 50%, by weight, of butyric acid;
from 10 to 26%, by weight, of acetic acid; and
from 0.75 to 1.95%, by weight, of hydroxyl groups.

It is preferred to use cellulose acetobutyrates having the following composition:
from 42 to 46%, by weight, of butyric acid;
from 18 to 21%, by weight, of acetic acid; and
from 1.0 to 1.7%, by weight, of hydroxyl groups.

Suitable cellulose acetopropionates generally contain:
from 50 to 63.5%, by weight, of propionic acid;
from 1 to 12%, by weight, of acetic acid; and
from 1.2 to 1.95%, by weight, of hydroxyl groups.

Preferred cellulose acetopropionates have the following composition:
from 54 to 58%, by weight, of propionic acid;
from 5 to 8%, by weight, of acetic acid; and
from 1.5 to 1.8%, by weight, of hydroxyl groups.

It is preferred to use mixtures with cellulose acetobutyrates.

The relative viscosities ($\eta_{rel}$) of 2% acetone solutions of the aliphatic cellulose esters, measured at 25° C., amount to from 3.5 to 5.0, preferably from 4.0 to 4.5.

The ethylene/vinyl acetate copolymers may be produced by known high-pressure and medium-pressure processes, optionally in solvents, such as t-butanol. They have a vinyl acetate content of from 30 to 98%, by weight, preferably from 60 to 80%, by weight.

The ethylene/vinyl acetate copolymers produced by the high pressure process have melt index values (at 190° C. under a load of 2.16 kp according to DIN 53,735) of from 0.1 to 100 g, preferably from 1.0 to 10 g, more particularly from 4.5 to 6 g. The intrinsic viscosities as measured in tetralin at 120° C. generally amount to from 0.6 to 1.5 dl/g. The molecular weights, as determined by the light scattering method, are preferably from 50,000 to about 1 million. The inconsistency factor (U) defined in accordance with the relation $M_w/M_n - 1$ (G. Schulz, Z, phys. Chem. (B) 43 (1939), pages 25–34), is from 1.6 to 30. These copolymers are preferably soluble in hot hydrocarbons.

The ethylene/vinyl acetate copolymers produced, for example, by solution or emulsion polymerisation and containing from 30 to 98%, by weight, preferably from 60 to 80%, by weight, of vinyl acetate have melt index values (190° C./2.16 kp) which may be in excess of 100 g, although the melt index range is preferably below 15 g, more particularly from 0.5 to 5 g. The molecular weights, as measured by the light scattering method, are preferably from 40,000 to 1 million. The inconsistency factor (U) amounts to from 1 to 6. The copolymers are soluble in hydrocarbons and alcohols and preferably have intrinsic viscosities in toluene of from 0.5 to 2.5 dl/g.

If desired, the ethylene/vinyl acetate copolymers may be completely or partly hydrolysed.

The known unfavourable effect of so-called "plasticiser migration" does not occur in the polymer mixtures of organic cellulose esters and ethylene/vinyl acetate copolymers, because the processing of the mixtures does not require the addition of plasticisers and similar auxiliaries. As a result, mixtures of this type are particularly suitable for applications requiring physiological compatibility.

The mixtures of organic cellulose esters and ethylene/vinyl acetate copolymers are produced by intensively mixing the components. Any known mixing processes may be used for this purpose, for example mixing on mixing rolls or in screw extruders. The mixtures of organic cellulose esters and ethylene/vinyl acetate copolymers used in accordance with the present invention may readily be processed continuously and in batches in conventional extruders and injection-moulding machines and, in this regard, show good flow properties.

They may be directly injection-moulded into actual lenses. However, it is also possible initially to produce blanks which may then be machined and polished. The hard to semi-hard contact lens materials obtainable in this way have a water absorption capacity of approximately 2%. The oxygen permeation coefficient (Pg) thereof at 25° C. amounts to $2.01 \times 10^{-4}$ /μl.cm/cm$^2$.h.mmHg (see M. F. Refojo et al, Contact Lens, October/December, 1977, page 27).

EXAMPLE

A polymer mixture consisting of 10 parts, by weight, of ethylene/vinyl acetate copolymer (vinyl content: 70%, by weight, intrinsic viscosity: 1.5 dl/g, as measured at 25° C. in THF) and 90 parts, by weight, of cellulose acetobutyrate (hydroxyl content: 1.7%, by weight, butyric acid content: 46.5%, by weight, acetic acid content: 20%, by weight) is degassed in a degassing extruder at 225° C. and processed to form a cylindrical granulate. The granulate is melted at 200° C. in an injection moulding machine and injection-moulded to form round bars measuring 20×2 cm. 2.3 mm thick wafers are cut from the round bars under water by means of a diamond disc. Contact lenses are produced from these wafers on a lathe equipped with a diamond cutter turning at 3000 rpm. The contact lens is fitted onto a silk-covered brass head and polished using polishing paste in turpentine at 3000 rpm. The lens is sterilised in boiling water and stored for 1 week in physiological common salt solution, the solution being repeatedly changed. Before insertion into the eye of a rabbit, the lens is stored for 2 days in a conventional commercial-grade storage medium for hydrophilic contact lenses which contains 0.001% of preservative. The eye of the rabbit is examined daily. After 30 days' continuous wearing, there were no signs of any vascularisation in the vicinity of the lens, in addition to which the conjunctiva was free from irritation.

By contrast, a hard lens of polymethyl methacrylate fitted to the other eye of the rabbit produced a slight hazing of the epithelium in the peripheral region of the lens and fine vascularisation in the lower region of the eye after the same period (30 days).

We claim:

1. A contact lens or scleral lens formed of a mixture consisting essentially of
   (1) from 99 to 70% by weight of a cellulose ester of at least one aliphatic carboxylic acid having 1 to 5 carbon atoms and
   (2) from 1 to 30% by weight of an ethylene/vinyl acetate copolymer containing from 30 to 98% by weight of incorporated vinyl acetate.

2. The contact lens or scleral lens of claim 1 wherein (1) is a member selected from the group consisting of cellulose acetate, cellulose acetopropionate and cellulose acetobutyrate.

3. A contact lens of scleral lens of claim 1 wherein the vinyl acetate content of (2) is from 60 to 80% by weight.

4. A contact lens or scleral lens of claim 1 wherein (2) is at least partially hydrolyzed.

* * * * *